United States Patent [19]

Noakes

[11] Patent Number: 5,113,976
[45] Date of Patent: May 19, 1992

[54] REEL CHOCK WITH SET SCREWS FOR FLANGE ENGAGEMENT

[76] Inventor: Larry R. Noakes, 21155 SW. Sandra La., Aloha, Oreg. 97006

[21] Appl. No.: 604,214

[22] Filed: Oct. 29, 1990

[51] Int. Cl.⁵ .............................................. B60T 3/00
[52] U.S. Cl. .................................. 188/32; 188/4 R; 410/49
[58] Field of Search .............. 188/4 R, 5, 32, 36, 188/70 R, 74; 410/49, 2, 44, 47, 71, 121, 122; 248/313, 316.1; 211/13; 269/249, 76

[56] References Cited

U.S. PATENT DOCUMENTS

| | | | |
|---|---|---|---|
| Re. 14,306 | 5/1917 | Evans | 188/32 |
| 1,153,607 | 9/1915 | Cope | 188/32 |
| 1,156,603 | 10/1915 | Kiefer | 248/316.1 |
| 1,228,438 | 6/1917 | Horan et al. | 188/32 |
| 1,229,714 | 6/1917 | Clark et al. | 188/32 |
| 1,429,921 | 9/1922 | Blakely | 188/32 |
| 1,501,883 | 7/1924 | Houghton | 188/32 |
| 1,538,998 | 5/1925 | Michod | 188/32 |
| 2,613,764 | 10/1952 | Worden | 188/32 |
| 2,630,192 | 3/1953 | Stenhouse | 188/32 |
| 2,915,850 | 12/1959 | Goodfellow | 188/32 |
| 3,297,111 | 1/1967 | Lisboa | 188/32 |
| 4,031,983 | 6/1977 | Lentini | 188/32 |
| 4,126,211 | 11/1978 | Blosser | 188/32 |
| 4,432,526 | 2/1984 | Withers et al. | 410/49 X |

Primary Examiner—Robert J. Oberleitner
Assistant Examiner—Josie A. Balloto
Attorney, Agent, or Firm—Eugene D. Farley

[57] ABSTRACT

A reel chock for releasably securing to a support surface a heavy reel provided with terminal flanges includes a base and outer and inner side plates defining between them a recess which freely receives one of the reel flanges. Chock flanges releasably secure the chock to the support surface. At least one set screw is mounted in one of the side plates, and releasably bears against the reel, holding it in position. The chocks preferably are used in two opposed pairs, one pair on each reel flange.

3 Claims, 1 Drawing Sheet

U.S. Patent
May 19, 1992
5,113,976
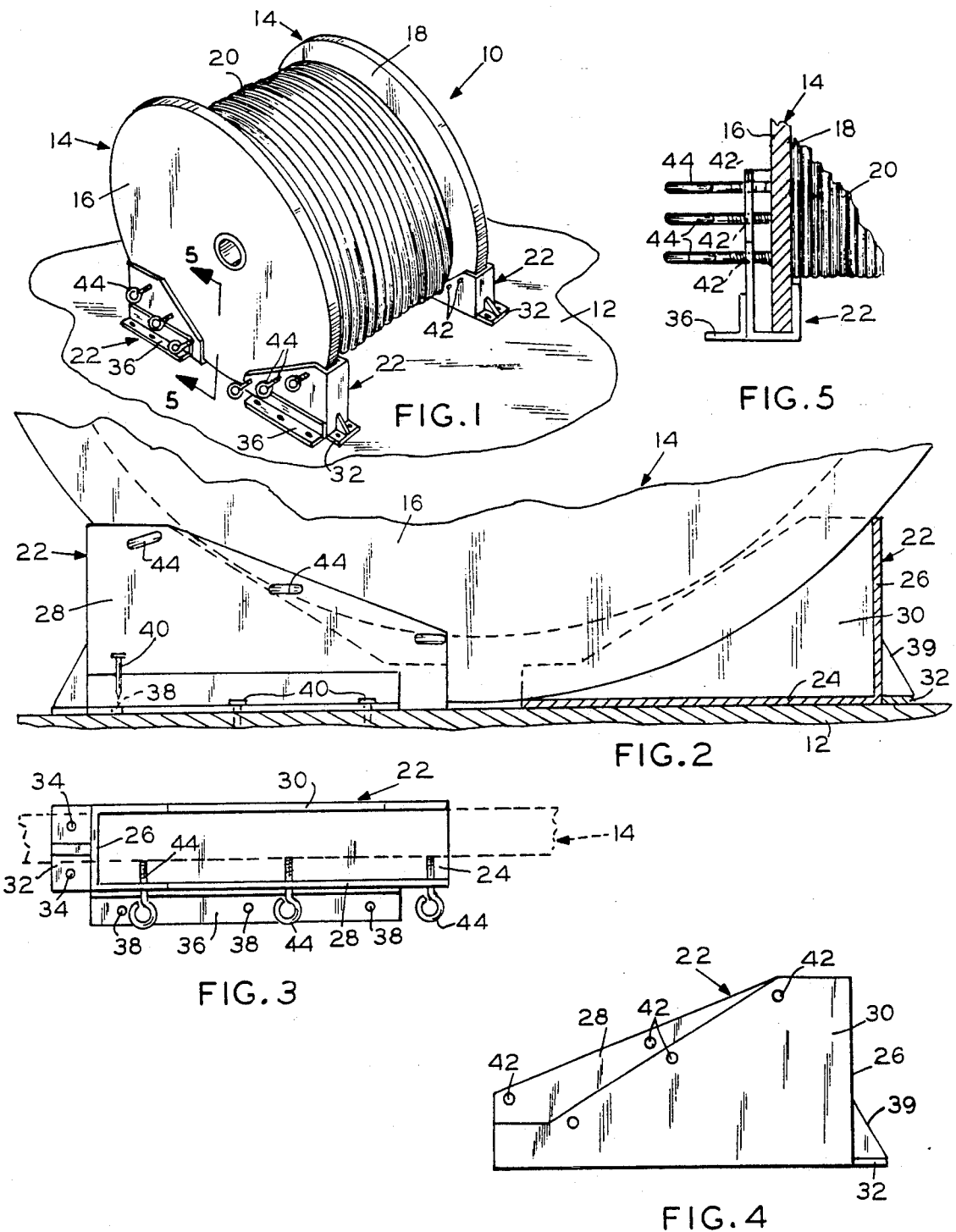

REEL CHOCK WITH SET SCREWS FOR FLANGE ENGAGEMENT

This invention relates to reel chocks of the class used for stabilizing and restraining during transportation and storage the large reels commonly employed for handling cable, telephone wire, rope, hose and like materials.

BACKGROUND AND GENERAL STATEMENT OF THE INVENTION

In the manufacture, transportation, storage and application of cable, telephone wire, rope, hose and like materials it is common practice to wind the material on a reel of substantial diameter. The reel basically comprises a cylinder with circular end or terminal flanges. The reel product may be of substantial weight, for example as much as 5000 or 6000 pounds. Because of its mobility, a serious hazard is presented to handling personnel and bystanders as the loaded reel is moved from place to place, stored, and used.

It accordingly is the general purpose of the present invention to provide a reel chock for releasably securing the reel to a support surface such as a wooden warehouse floor or truck bed, which chock is of simple, durable construction; which is easily manufactured; which is safe and easy to use; and which is reusable over a long service life.

The foregoing and other purposes of my invention are accomplished by the provision of a chock suitable for use with a reel provided with terminal flanges. The chock comprises an assembly of plates arranged to provide a recess which receives an edge portion of each reel flange.

One of the plates comprises a side plate having transversely disposed openings through which at least one reel-retaining pin or setscrew is mounted for bearing engagement with the adjacent reel flange.

The plate assembly includes an inner side plate which has a cut-away upper portion for accommodating the surface contour of material mounted on the reel.

Chock securing means such as perforated flanges extending outwardly from the chock base and provided with spur type fasteners releasably secure the chock to the supporting surface, In use, the chock is slipped under the reel flange and tacked to the supporting surface. The setscrews are tightened down against the outer surface of the reel flange. Companion chocks, usually a sufficient number to total 4, arranged in pairs in opposed relation, thus are applied, thereby releasably restraining the reel and maintaining it in position until its release is desired.

THE DRAWINGS

In the drawings:

FIG. 1 is a top perspective view of a cable reel releasably retained in a supporting surface by the chocks of my invention.

FIG. 2 is a fragmentary elevation, partly in section, of the reel-chock assembly.

FIG. 3 is a plan view of the chock.

FIG. 4 is an enlarged side elevation of the chock.

FIG. 5 is a fragmentary sectional view taken along line 5—5 of FIG. 1.

DESCRIPTION OF A PREFERRED EMBODIMENT OF THE INVENTION

As is apparent from a consideration of FIG. 1, the reel chock of my invention is designed for use with a conventional reel, indicated generally at 10, mounted on a supporting surface such as a wooden truck bed or warehouse floor, indicated at 12.

The reel is of large size and conventional construction. It comprises a central cylinder with a pair of attached terminal flanges, 14. Each reel flange has an outer face 16 and an inner face 18.

A quantity of cable 20 or other elongated material is wound about the reel in the usual manner.

The reel chocks indicated generally at 22, preferably are used in two opposed pairs. One pair is associated with each reel flange.

Each chock comprises a base plate 24, an end plate 26, an outer side plate 28, and an inner side plate 30.

In view of the great weight to be restrained, the plates preferably are made of heavy gauge steel.

It is a feature of the invention that the chock may be simply manufactured by providing a steel sheet which is bent to form a base integral with the two side plates. The end plate then is welded across one end to provide a central recess dimensioned to receive a portion of reel flange 14.

Inner side plate 30 has a portion of its upper surface cutaway, as indicated in FIG. 4, to provide a contour which accommodates the bulk of the material reeled on the reel.

Chock securing means are provided for releasably securing the chock to the support surface.

In the illustrated form of the invention, such means comprise perforated flanges extending outwardly from the base plate and associated spur type fasteners for mounting in the perforations and securing the chock to the underlying support surface.

In the illustrated embodiment there are two such flanges: end flange 32 with holes 34 and side flange 36 with holes 38.

A gusset plate 39, desirable to strengthen the assembly in view of the great force developed by the rolling motion of the loaded reel, reinforces end flange 32.

Spur type fasteners in the form of nails 40 are provided to temporarily secure the flanges, and hence the chock, to the supporting surface.

Side plates 28 and 30 overlie the adjacent reel outer faces to a substantial extent. At least one of them is provided with openings 42 which accommodate reel-retaining pin means dimensioned for reception in the openings and bearing against the surface of the adjacent reel flange for restraining the reel from movement during use of the chock.

Openings 42 preferably comprise threaded openings. They receive set screws 44 in threaded engagement. In the use of the chock the setscrews may be screwed down into bearing engagement with the surface of the underlying reel flange to provide the desired restraint.

OPERATION

In the use of the chock, one or more of them, preferably two pairs arranged in opposition to each other, are placed under the flanges of the reel. The chocks are tacked to the underlying wooden warehouse floor or truck bed by means of nails 40.

Set screws 44 are tightened down against the underlying reel flange surfaces. The reel thus is immobilized during storage or transportation.

When it is desired to release the reel, all that is necessary is to release setscrews 44 and remove nails 40. The reel and its contents then may be applied as desired and the chocks preserved for re-use.

Having thus described in detail a preferred embodiment of the present invention, it will be apparent to those skilled in the art that many physical changes may be made in the apparatus without altering the inventive concepts and principles embodied therein. The present embodiment is therefore to be considered in all respects as illustrative and not restrictive, the scope of the invention being indicated by the appended claims.

I claim:

1. A reel clock for releasably securing to a support surface a heavy reel provided with terminal flanges, each having an inner surface and an outer surface and with material mounted thereon, the chock comprising:
   (a) an elongated base plate,
   (b) an elongated outer side plate on and extending upwardly from the base plate and dimensioned to overlie the outer surface of a reel flange.
   (c) an elongated inner side plate on and extending upwardly from the base plate and dimensioned to overlie the inner surface of a reel flange.
   (d) the inner side plate having a portion of its upper surface cut away for accommodating the surface contour of the material mounted on the reel,
   (e) the outer one of the side plates having a plurality of longitudinally spaced threaded openings therethrough,
   (f) threaded pin means in the threaded openings in the outer side plate for releasable bearing engagement with the adjacent surface of the reel flange, and
   (g) chock securing means for releasably securing the chock to a support surface.

2. The reel chock of claim 1 wherein the threaded pin means comprises set screws.

3. The reel chock of claim 1 wherein the elongated base plate, outer side plate and inner side plate comprise a single twice-bent strip of structural material of U-shaped cross section.

* * * * *